US006498770B1

(12) United States Patent
Rockenbauch et al.

(10) Patent No.: US 6,498,770 B1
(45) Date of Patent: Dec. 24, 2002

(54) TIMER CIRCUIT UTILIZING THERMAL EFFECT

(75) Inventors: Craig A. Rockenbauch, Severna Park, MD (US); James F. Korenz, Uniontown, OH (US)

(73) Assignee: The United States of America as represented by the National Security Agency, Washington, DC (US)

( * ) Notice: Subject to any disclaimer, the term of this patent is extended or adjusted under 35 U.S.C. 154(b) by 307 days.

(21) Appl. No.: 09/675,896

(22) Filed: Sep. 28, 2000

(51) Int. Cl.[7] .......................... G04F 10/00; H02H 3/18; H02H 5/04

(52) U.S. Cl. ......................... 368/108; 368/121; 361/87; 361/93.8; 361/103

(58) Field of Search ................................ 368/107–108, 368/113, 121; 327/227, 229, 512, 525; 337/290, 401; 361/78, 87, 93.1, 93.8, 94, 100, 101, 103, 104, 106

(56) References Cited

U.S. PATENT DOCUMENTS

| | | | | |
|---|---|---|---|---|
| 4,301,490 A | * | 11/1981 | Nagel et al. | 361/89 |
| 4,409,640 A | | 10/1983 | Profio et al. | |
| 4,560,892 A | | 12/1985 | Ryczek | |
| 4,703,390 A | * | 10/1987 | Fay et al. | 361/101 |
| 5,303,279 A | | 4/1994 | Fujii | |
| 5,589,792 A | * | 12/1996 | Brokaw | 327/512 |
| 6,351,361 B1 | * | 2/2002 | Kawazu et al. | 361/103 |
| 6,356,425 B1 | * | 3/2002 | Jung | 361/93.8 |

* cited by examiner

*Primary Examiner*—Vit Miska
(74) *Attorney, Agent, or Firm*—Jennifer P. Ferragut

(57) ABSTRACT

A timer circuit that utilizes the thermal runaway effect, and includes a switch, a resistor, a transistor and a protective device. The temperature of the transistor rises due to a phenomenon known as the thermal runaway effect, which causes the temperature of the transistor to rise while increasing current flow. This will eventually cause the protective device to activate. The time it takes to activate the protective device is predictable for a given transistor, therefore the circuit operates as a timer. In an alternate embodiment, a heat source is used. This heat source rises in temperature as current flows in the circuit. A heat sensor located near the heat source rises in temperature along with the heat source. A comparator compares the temperature from this heat sensor with the temperature of a heat sensor located further from the heat source. When there is a user-definable difference in temperature due to thermal diffusion between the two heat sensors, power to the transistor is disconnected. Since the heat sensors will change temperature at a predictable rate depending on the type of sensor and distance from the heat source, this circuit acts as a timer.

11 Claims, 2 Drawing Sheets

TIMER CIRCUIT UTILIZING THERMAL EFFECT

FIELD OF INVENTION

The present invention relates, in general, to a control circuit, and, in particular, to a time delay circuit.

BACKGROUND OF INVENTION

Several different designs exist for timer circuits. An example of a fairly simple design can be found in U.S. Pat. No. 4,409,640 entitled "ABORT CYCLE TIMER." U.S. Pat. No. 4,409,640 is hereby incorporated by reference into the specification of the present invention. This invention disclosed typical configurations of some Resistor-Capacitor (R-C) timer circuits. For these to operate, the circuits require a voltage source, at least one resistor, at least one capacitor, and a threshold circuit. The threshold circuit determines when the capacitor has charged to the appropriate voltage, and sends a signal. Since this occurs at regular intervals, a timer is created. The required threshold circuit is made up of several additional components. This makes the R-C timer circuit complicated, and thus more susceptible to failure.

A similar timer circuit is disclosed in U.S. Pat. No. 4,560,892 entitled "ONE-SHOT DELAY TIMER." U.S. Pat. No. 4,560,892 is hereby incorporated by reference into the specification of the present invention. In U.S. Pat. No. 4,560,892, an R-C timer circuit of the type described above is disclosed. The threshold circuit adds a number of resistors and an operational amplifier to the device. This makes the device complicated and more susceptible to failure. Further, the operational amplifier increases the cost a significant amount since it is also composed of transistors, resistors and capacitors.

The other major type of timer circuit is a digital timer circuit. An example of this type of circuit was disclosed in U.S. Pat. No. 5,303,279 entitled "TIMER CIRCUIT." U.S. Pat. No. 5,303,279 is hereby incorporated by reference into the specification of the present invention. U.S. Pat. No. 5,303,279 uses a clock circuit, a bit counter, an overflow detection circuit, a delay circuit and a switch circuit to construct a timer circuit. The clock circuit sends bits to the bit counter. The bit counter, after receiving a certain number of bits, submits received bits to the overflow detector. The overflow detector then sends a signal to the delay circuit. The delay circuit holds the bits for a certain period of time before releasing them. This will occur at regular intervals, creating a timer. Each of these components is made up of complicated circuitry including resistors, transistors, and flip-flops, among other things. This decreases the reliability of the circuit and increases the overall cost. While the use of these types of circuits may be necessary for situations requiring high precision, the problems associated with them make them undesirable for less precise applications.

SUMMARY OF THE PRESENT INVENTION

It is an object of the present invention to create a timer circuit utilizing the thermal runaway effect.

It is a further object of this invention to create a timer circuit utilizing the thermal diffusion effect capable of being used in an integrated circuit.

The present invention is a timer circuit utilizing the thermal runaway effect. The preferred timer circuit includes a switch, a resistor, a transistor and a protective device. A current is caused to flow in a first terminal of the transistor, which, in time, causes a current to flow in a second terminal of the transistor. This current flowing in the second terminal heats the transistor and increases its gain and leakage current. The increased gain causes a higher current to flow in the second terminal which heats the transistor further. This cycle eventually activates the protective device, which both acts as the time indicator and disconnects the power to the transistor to protect the transistor from destruction.

An alternate embodiment includes a switch, a resistor, a transistor, a heat source, two heat sensors and a comparator. The heat source rises in temperature due to the current flowing in the second terminal of the transistor. The two heat sensors rise in temperature due to the rise in temperature of the heat source, but one is located closer to the heat source than the other. A comparator compares the difference in temperature of the heat sensors, and when this difference reaches a user-definable value the comparator disconnects power to the transistor and activates a time indicator.

BRIEF DESCRIPTION OF THE DRAWINGS

The present invention will be described with reference to the accompanying drawing wherein like numerals represent like parts throughout the views, and wherein.

DETAILED DESCRIPTION

Figure 1:
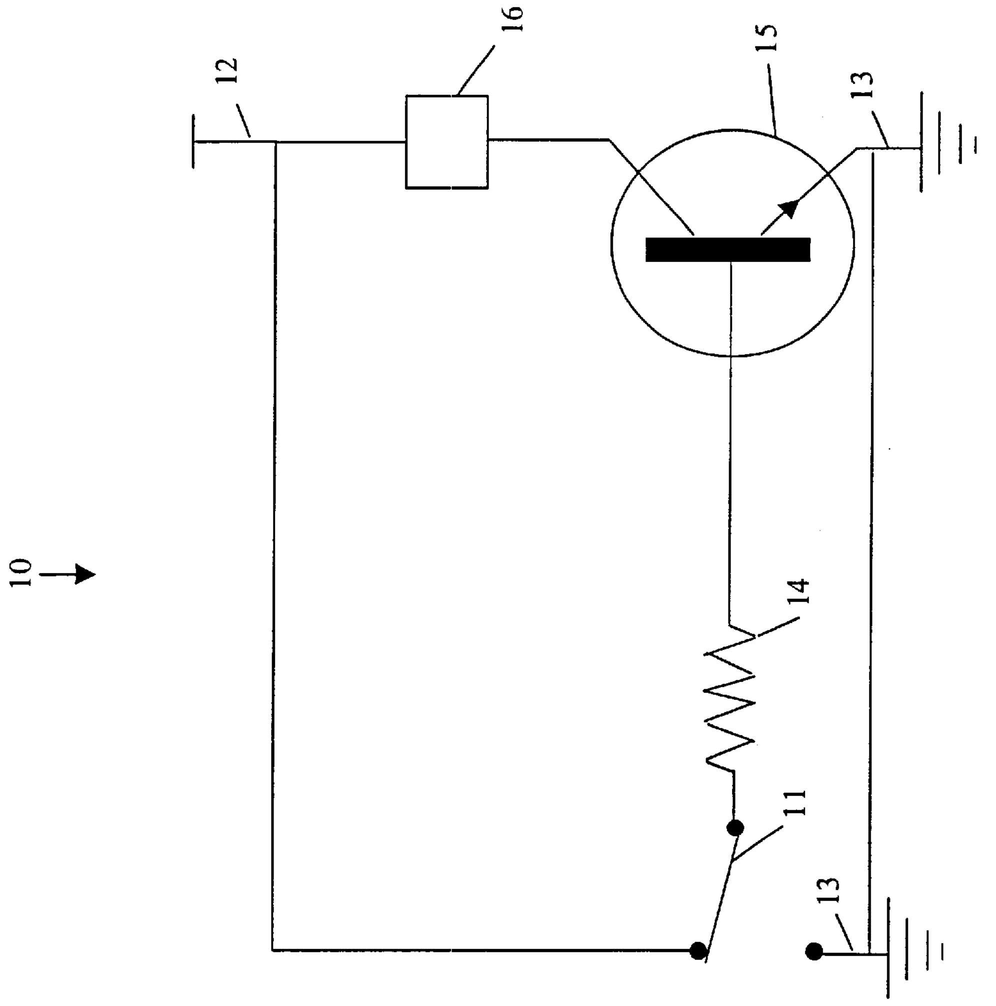
FIG. 1 is a schematic of a first embodiment of the timer circuit.

The present invention is a timer circuit utilizing the thermal runaway effect. FIG. 1 is a schematic of the first embodiment of the timer circuit 10. The timer circuit 10 includes a switch 11, a resistor 14, a transistor 15 and a protective device 16.

The switch 11 activates the timer circuit 10. Any suitable switching device may be used as the switch 11. The present invention will be described using a double-pole single-throw switch as the switch 11. The switch 11 has a first end that is fixed and a second end that switchably alternates between a power supply voltage 12 and ground 13 to turn the timer circuit 10 on and off.

The first end of the switch 11 is connected to a first end of the resistor 14. Though many resistor values could be used to put the transistor 15 into thermal runaway, a typical value for the resistor 14 is 22 kΩ. Such devices are both commercially available and well known in the art.

The transistor 15, preferably a germanium transistor, has a first terminal, a second terminal, and a third terminal. The first terminal, or base, of the transistor 15 is connected to the second end of the resistor 14. The transistor 15 may be any suitable transistor, such as an NPN transistor or a PNP transistor. The present invention will be described using an NPN transistor for the transistor. However, the differences in operation between an NPN transistor and a PNP transistor have to be accounted for. A person skilled in the art knows how to account for these differences.

The second terminal, or collector, of the transistor 15 is connected to a first end of a protective device 16. The second end of the protective device is connected to the power supply voltage 12. The protective device 16 may be any device that can disconnect power to the transistor 15 at a user-selectable current level. There are two basic types of protective device 16, both of which may be used in the present invention. These are one-time use devices, such as flash bulbs, fuses, and pyrotechnic actuators, or repeated use devices, such as relays. A one-time use device will destroy itself, but protect the transistor 15 from destruction. A repeated use device will protect the transistor 15, but will not destroy itself in the process. Both of these types of devices are commercially available and well known in the art. The protective device 16 can also be connected to a time indicator (not shown), such as a counter, depending on the needs of the user. Such devices are commercially available and well known in the art.

If the second end of the switch 11 is connected such that the transistor 15 is on, then a base current ($I_B$) flows in the first terminal of the transistor 15. The resistor 14 is used to set the exact value of $I_B$ in an NPN transistor according to the equation:

$$I_B=(V_P-V_{BE})/R,$$

where $V_p$ is the voltage of the power supply, $V_{BE}$ is the voltage between the base and the emitter of the transistor 15, and R is the value of the resistor 14.

$I_B$ causes a collector current ($I_C$) to flow in the second terminal of the transistor 15. As $I_C$ flows through the transistor 15, the transistor 15 heats up. This causes the gain in the transistor 15 to increase, and, therefore, $I_C$ to increase, according to the equation:

$$I_C=\beta I_B,$$

where β is the gain of the transistor 15. Thus, as the gain increases, $I_C$ increases, causing the temperature of the transistor 15 to rise further, causing a, and, therefore, $I_C$ to further increase and so on. This cycle, known as the thermal runaway effect, will increase $I_C$ of the transistor 15 at a predictable rate depending on the parameters of the timer circuit 10. Varying the values of the resistor 14 and the power supply voltage 12, and varying the type of transistor 15, will vary the rate of the thermal runaway. Therefore, a user should choose a resistor, a power supply voltage and a transistor type in order to achieve the desired time delay. Such devices are commercially available and well known in the art.

The collector current flowing in the second terminal of the transistor 15 also flows through a protective device 16. At a user-selectable current level, the protective device 16 will disconnect the transistor 15 from the power supply voltage 12. This protective device 16 only disconnects the power after the collector current has increased due to the thermal runaway effect. Since $I_C$ increases at a predictable rate, the protective device 16 will be activated at a known time after the timer circuit 10 is activated.

Figure 2:
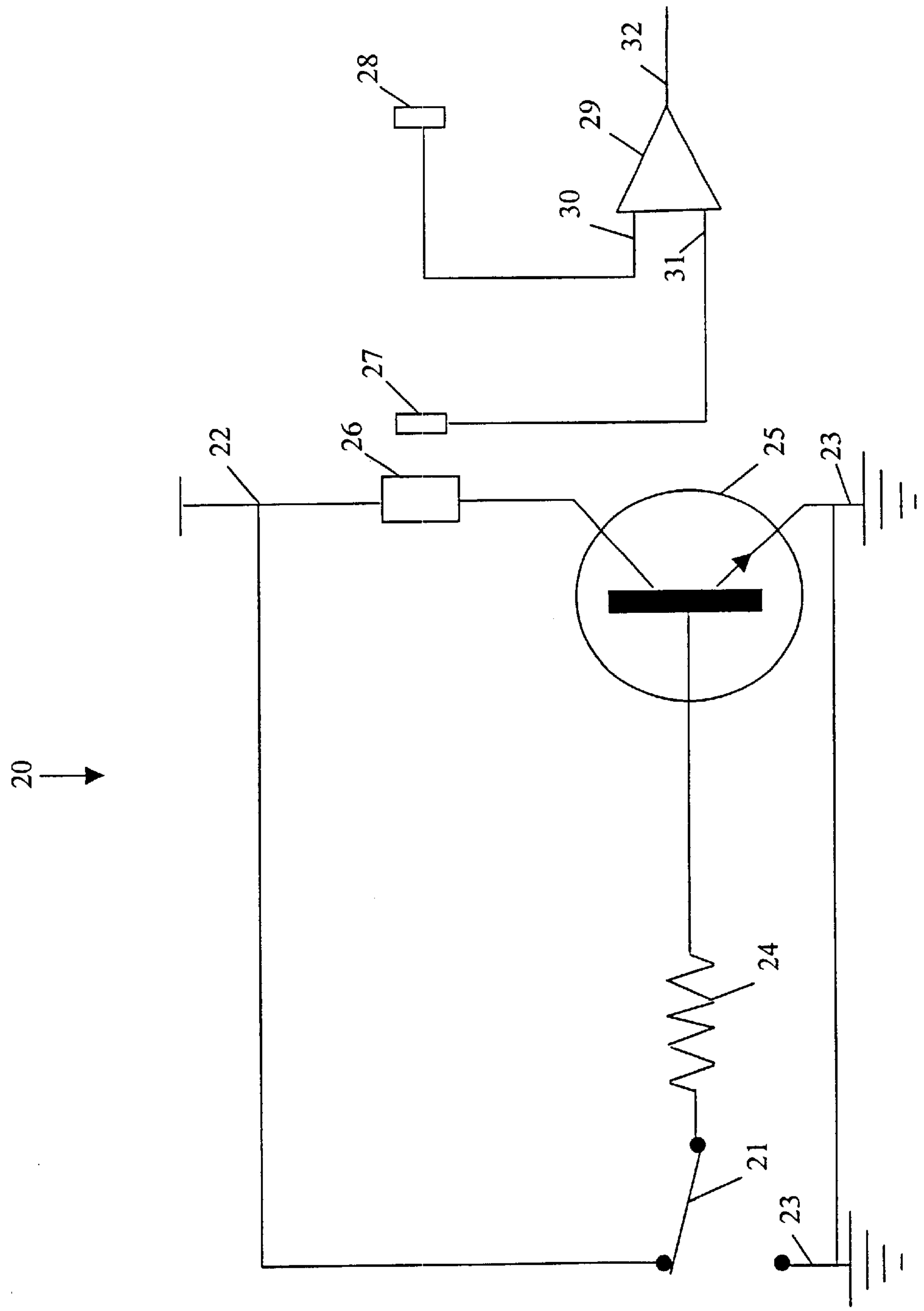
FIG. 2 is a schematic of a second embodiment of the timer circuit.

There is a second embodiment 20 of the present invention, shown in FIG. 2, designed for use on an integrated circuit. The second embodiment 20 has a switch 21, a resistor 24, a transistor 25, a heat source 26, a first heat sensor 27, a second heat sensor 28 and a comparator 29.

The switch 21 activates the second embodiment 20. Any suitable switching device may be used as the switch 21. The present invention will be described using a double-pole single-throw switch as the switch 21. The switch 21 has a first end that is fixed and a second end that switchably alternates between a power supply voltage 22 and ground 23 to turn the second embodiment 20 on and off.

The first end of the switch 21 is connected to a first end of the resistor 24. Though many resistor values could be used to cause the transistor 25 to go into saturation, a typical value for the resistor 24 is 2 kΩ. Such devices are both commercially available and well known in the art.

The transistor 25 has a first terminal, a second terminal and a third terminal. The first terminal or base, of the transistor 23 is connected to the second end of the resistor 24. The transistor 25 may be any suitable transistor, such as an NPN transistor or a PNP transistor, as described above. The present invention will be described using an NPN transistor for the transistor 25

The second terminal, or collector, of the transistor 25 is connected to a first end of the heat source 26. The second end of the heat source 26 is connected to a power supply voltage 22. Any device that will heat up in response to current flow can be used as a heat source 26. Such devices are both commercially available and well known in the art.

The first heat sensor 27 is located a first distance from the heat source 26 such that, as the temperature of the heat source 26 increases by thermal diffusion, the temperature of the heat sensor 27 increases. Any suitable heat sensor that can perform this function is acceptable for the present invention. Such devices are both commercially available and well known in the art.

The second heat sensor 28 is located a second distance from the heat source 26. This second heat sensor 28 should also rise in temperature due to thermal diffusion in response to a corresponding rise in temperature in the heat source 26. However, the distance the second heat sensor 28 is separated from the heat source 26 should ensure that the second heat sensor 28 rises in temperature at a different rate than the first heat sensor 27. The second heat sensor 28 is preferably the same type of device as the first heat sensor 27, though any suitable heat sensor may be used.

The comparator 29 is connected to both the first heat sensor 27 and the second heat sensor 28 via inputs 30 and 31. The comparator 29 also has an output 32, at which appears the output of the second circuit 20. The comparator 29 can be any device capable of comparing data received form the two heat sensors, such as an operational amplifier. Such devices are both commercially available and well known in the art.

If the second end of the switch 21 is connected such that the transistor 25 is on, then current ($I_B$) flows in the base, or first terminal of the transistor 25. The resistor 24 is used to set a value of $I_B$ that will cause saturation in the transistor 25 according to the equation:

$$I_B=(V_P-V_{BE})/R,$$

where $V_P$ is the voltage of the power supply, $V_{BE}$ is the voltage between the base and the emitter of the transistor 25, and R is the value of the resistor 24. $I_B$ causes a collector current ($I_C$) to flow in the second terminal of the transistor 25. As $I_C$ flows in the second terminal of the transistor 25, the heat source 26 heats up. Varying the values of the resistor 24 and the power supply voltage 22, the type of heat source 26, and the type of transistor 25, will vary the rate of thermal diffusion. Therefore, a user should choose a resistor, a power supply voltage, a heat source, and a transistor in order to achieve the desired time delay. Such devices are commercially available and well known in the art.

As $I_C$ flows through the heat source 26, the heat source 26 warms up. The first heat sensor 27 will increase in temperature as the heat source 26 increases in temperature. The temperature data from the first heat sensor 27 and the second heat sensor 28 are sent to the comparator 29 via the inputs 30 and 31. As soon as the temperature of first heat sensor 27 is greater than the temperature of the second heat sensor 28 by a predetermined amount, the comparator 29 is activated. When the comparator 29 is activated, the transistor 25 is disconnected from the power supply voltage 22. Since the second heat sensor 28 is located further from the heat source 26 than the first heat sensor 27, the second heat sensor 28 will not rise in temperature until after the first heat sensor 27 has risen in temperature. Thus, the second heat sensor 28 acts as the reference. To change the time delay before the comparator 29 is activated the distance between the first heat sensor 27 and the heat source 26 can be varied. The farther the first heat sensor 27 is from the heat source 26, the longer it will take for the first heat sensor 27 to change temperature, and thus the longer the delay will be before the comparator 29 is activated. The temperature difference in between the first heat sensor 27 and the second heat sensor 28 that activates the comparator 29 is user-definable.

What is claimed is:

1. A timer circuit including:

a) a switch, having a first end and a second end, where said second end is switchably connected between a power supply voltage and a ground potential;

b) a resistor, having a first end connected to said first end of said switch, and having a second end;

c) a transistor, having a first terminal connected to said second end of said resistor, a second terminal and a third terminal connected to said ground potential; and d) a protective device connected between said second terminal of said transistor and said power supply voltage.

2. The device of claim 1, wherein said protective device is chosen from the group of protective devices consisting of a flash bulb, a fuse a pyrotechnic actuator, and a relay.

3. The device of claim 1, wherein said resistor has a value of 22 kΩ.

4. The device of claim 1, wherein said transistor is chosen from the group of transistors consisting of a PNP transistor and an NPN transistor.

5. The device of claim 1, wherein said protective device is connected to a time indicator.

6. The device of claim 2, wherein said resistor has a value of 22 kΩ.

7. The device of claim 6, wherein said transistor is chosen from the group of transistors consisting of a PNP transistor and an NPN transistor.

8. A timer circuit including:

a) a switch, having a first end and a second end, where said second end is switchably connected between a power supply voltage and a ground potential;

b) a resistor, having a first end connected to said first end of said switch, and having a second end;

c) a transistor, having a first terminal connected to said second end of said resistor, a second terminal, and a third terminal connected to said ground potential;

d) a heat source connected between said second terminal of said transistor and said power supply voltage;

e) a first heat sensor located a first distance from said heat source;

f) a second heat sensor located a second distance from said heat source, where said second distance from said heat source is greater than said first distance from said heat source; and g) a comparator, having a first input connected to said first heat sensor, a second input connected to said second heat sensor, and an output.

9. The invention of claim 8, wherein said comparator is an operational amplifier.

10. The device of claim 8, wherein said transistor is chosen from the group of transistors including a PNP transistor and an NPN transistor.

11. The device of claim 9, wherein said transistor is chosen from the group of transistors consisting of a PNP transistor and an NPN transistor.

* * * * *